United States Patent [19]

Ishida

[11] Patent Number: 5,326,650

[45] Date of Patent: Jul. 5, 1994

[54] SOLID OXIDE FUEL ELECTRODES AND PROCESS FOR PRODUCING

[75] Inventor: Yoshihiko Ishida, Nagoya, Japan

[73] Assignee: NGK Insulators, Ltd., Japan

[21] Appl. No.: 44,108

[22] Filed: Apr. 9, 1993

Related U.S. Application Data

[63] Continuation of Ser. No. 857,966, Mar. 26, 1992, abandoned.

[30] Foreign Application Priority Data

Mar. 27, 1992 [JP] Japan .................................. 3-085834

[51] Int. Cl.$^5$ .............................................. H01M 8/10
[52] U.S. Cl. ........................................ 429/27; 429/34; 429/32
[58] Field of Search ......................... 429/30–33, 429/27.13, 34

[56] References Cited

U.S. PATENT DOCUMENTS

| | | | |
|---|---|---|---|
| 3,565,691 | 2/1971 | Strier et al. | 429/34 X |
| 4,002,493 | 1/1977 | Warszawski | 429/34 X |
| 4,189,526 | 2/1980 | Cretzmeyer et al. | 429/27 X |
| 4,704,340 | 11/1987 | Kunz | 429/34 X |
| 4,844,992 | 7/1989 | Strasser | 429/34 |
| 5,145,752 | 9/1992 | Goldstein et al. | 429/27 |
| 5,219,673 | 6/1993 | Kaun | 429/32 |

FOREIGN PATENT DOCUMENTS

1-128359 5/1989 Japan .

*Primary Examiner*—Anthony Skapars
*Attorney, Agent, or Firm*—Parkhurst, Wendel & Rossi

[57] ABSTRACT

A solid oxide fuel cell is disclosed, which includes flat plate-shaped solid oxide fuel cell elements. The solid oxide fuel cell element includes an ion-conductive ceramic plate, and an air electrode and a fuel electrode formed on opposite surfaces of the ion-conductive ceramic plate, respectively, wherein conductive strips which have less resistance than the electrode are continuously formed on a surface of at least one of the air electrode and the fuel electrode. A solid oxide fuel cell is also disclosed, which includes a separator plate made of a material having oxidation resistance, reduction resistance and electron conductivity, an air electrode spacer made of a material having oxidation resistance and electron conductivity, the above flat plate-shaped solid oxide fuel cell element, and a fuel electrode spacer made of a material having reduction resistance and electron conductivity, wherein the separator plate, the air electrode spacer, the flat plate-shaped solid oxide fuel cell element and the fuel electrode spacer are successively laminated in this order. An oxidizing gas chamber is defined by the separator plate, the air electrode spacer and the element, and a fuel gas chamber is defined by the separator plate, the fuel electrode spacer and the element. A process is also disclosed for producing such a solid oxide fuel cell element.

3 Claims, 7 Drawing Sheets

FIG_3

FIG_4

FIG. 5

FIG_6

SOLID OXIDE FUEL ELECTRODES AND PROCESS FOR PRODUCING

This is a continuation of application Ser. No. 07/857,966 filed Nov. 26, 1992, now abandoned.

BACKGROUND OF THE INVENTION (1) Field of the Invention:

The present invention relates to solid oxide fuel cells and a process for producing the same.

(2) Related Art Statement:

Recently, fuel cells have been noted as power generating equipment. The fuel cell is a device capable of directly converting chemical energy possessed by fuel to electrical energy. Since the fuel cell is free from limitation of Carnot's cycle, the cell is a very promising technique owing to its high energy conversion efficiency, wide latitude of fuels to be used (naphtha, natural gas, methanol, coal reformed gas, heavy oil and the like), less public nuisance, and high electrical power generating efficiency without being affected by the scale of installation.

Particularly, since the solid electrolyte fuel cell (hereinafter referred to as "SOFC") operates at high temperatures of 1,000° C. or so, activity of electrodes is very high. Thus, no expensive catalyst of a noble metal, such as platinum is necessary. In addition, since the SOFC has low polarization and relatively high output voltage, its energy conversion efficiency is conspicuously much higher than those of the other fuel cells. Furthermore, since their constituent materials are all solid, the SOFC is stable and has long service life.

Since such fuel cells can be constructed by solid structural materials, various kinds of cell structures have been proposed. So-called flat plate-shaped solid oxide fuel cells are structurally very promising among them because their electric power per unit volume can be easily increased.

With the flat plate-shaped SOFC and monolithic SOFC, however, there are problems in producing technics and the like as follows.

An ion-conductive film of zirconia has been formed on a flat plate-shaped porous support by means of chemical vapor deposition (CVD), physical vapor deposition (PVD) or electrochemical vapor deposition (EVD). However, apparatuses for use in CVD, PVD and EVD are generally expensive and large in scale. Moreover, film forming speed is low so that these methods are low in productivity and not suitable for mass production and it is difficult to obtain films of wide areas. Furthermore, internal resistance in the cells is high owing to diffusion resistance of fuel gases passing through porous supports.

A method has been proposed to form corrugated green sheets of an ion-conductive film of zirconia, an air electrode film and a fuel electrode film, press contact these green sheets and sinter them. In this method, however, since green sheets of different materials are sintered together, it is difficult to adjust their shrinkages during firing. Further, when the green sheets are press contacted with one another, the green sheets are likely to be cracked or fractured. Moreover, insulating layers tend to be produced at interfaces between the ion-conductive film and the electrode films after they are sintered together.

In order to overcome these problems, Japanese Patent Application Laid-open No. 1-128,359 disclosed a method in which an ion-conductive plate of zirconia is formed by sintering, electrodes are formed on its both surfaces thereof to form a flat plate-shaped SOFC element, and multiple SOFC elements and insulating spacers are alternately laminated to form a SOFC.

However the, inventors' investigations revealed that these methods involved the following problems.

That is, columnar conductors have to be used to electrically connect the flat plate-shaped SOFC elements in parallel. Each of the columnar conductors contacts each air electrode or each fuel electrode at one location. Therefore, since electric current flows to this contact location between the conductor from the entire surface of each air electrode or fuel electrode along and in parallel to the filmy air electrode or filmy fuel electrode, electric resistance and voltage loss are very large when considered with respect to the entire SOFC. For this reason, it is necessary that the thickness of the air electrode and that of the fuel electrode are reduced as much as possible and the electric resistance up to the columnar conductor is reduced.

On the other hand, each of the fuel gas and the oxidizing ga needs to be fed to the interface between an ion-conductive plate and the electrode. For this purpose, gas-diffusing resistance in each of the air electrode and fuel electrode must be reduced. However, if the thickness of each of the air electrode and the fuel electrode is increased as mentioned above, the gas-diffusing resistance becomes very large. Consequently, the electric resistance and the gas-diffusing resistance are not satisfactorily small in each electrode.

SUMMARY OF THE INVENTION

It is an object of the present invention to reduce voltage loss in the air electrode and/or the fuel electrode of the flat plate-shaped SOFC element, simultaneously suppress the gas-diffusing resistance in these electrodes to a low level, and increase outputs from the planar SOFC element by optimizing the reduction in the voltage loss and the gas-diffusing resistance.

For attaining the above object, the present invention relates to a solid oxide fuel cell including a solid oxide fuel cell element constituted by an ion-conductive ceramic plate, and an air electrode and a fuel electrode formed on opposite surfaces of this ion-conductive ceramic plate, respectively, wherein conductive strips are formed in a continuous pattern on at least one of the surface of the air electrode and the surface of the fuel electrode.

In addition, the present invention relates to a process for producing such a solid oxide fuel cell, which includes the steps of forming an air electrode on one surface of a flat plate-shaped green sheet made of an ion-conductive ceramic molding material or an ion-conductive ceramic plate obtained by sintering such a green sheet, forming a fuel electrode on the other surface of the green sheet or the ion-conductive ceramic plate, and forming conductive strips in a continuous pattern on at least one of the surface of the air electrode and the surface of the fuel electrode.

According to the present invention, since the conductive strips are continuously formed on at least one of the surface of the air electrode and the surface of the fuel electrode, electrons flow in parallel to the electrode through the conductive strips. Therefore, since the conductive strips function as a kind of a current collector, current can flow under low resistance as a whole in parallel to the electrode. Thereby, the voltage loss when the current flows in parallel to the electrode can be reduced.

In addition, the gas-diffusing resistance can be reduced by decreasing the thickness of the electrode itself on which the conductive strips are formed. Even when the thickness of the electrode is decreased, increase in the voltage loss can be suppressed by the action of the conductive strips. Therefore, the output of the flat plate-shaped SOFC element can be increased.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Figure 1:
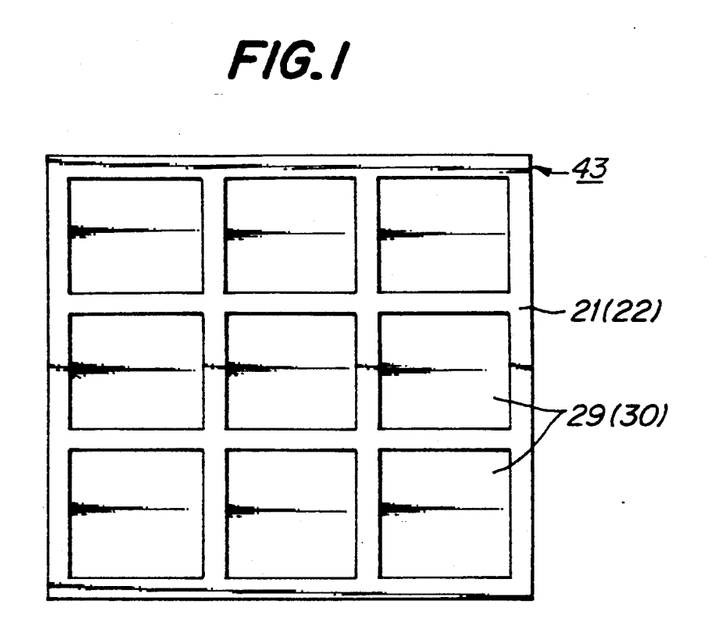
FIG. 1 is a plan view of an embodiment of the flat plate-shaped SOFC element according to the present invention.
Figure 2:
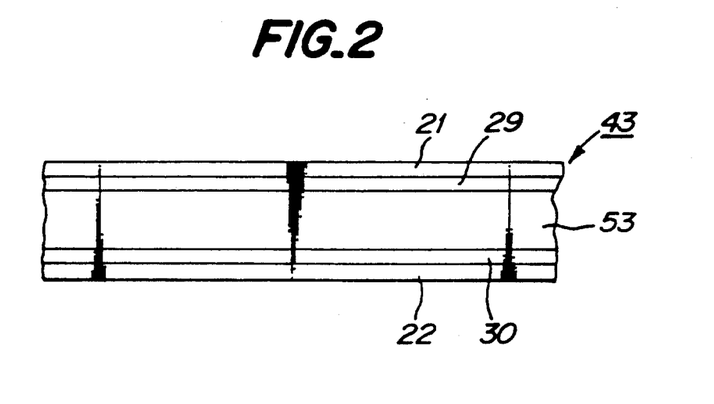
FIG. 2 is an enlarged front view of a part of the flat plate-shaped SOFC element in FIG. 1.

The present invention will be explained in more detail with reference to the attached drawings:

FIG. 1 is a plane view of one embodiment of the flat plate-shaped SOFC element according to the present invention, and FIG. 2 is an enlarged front view of a part of the SOFC element in FIG. 1.

In the flat plate-shaped SOFC element 43, an air electrode 29 is formed on one surface (on an upper surface in FIG. 2) of an ion-conductive ceramic plate 53, and a fuel electrode 30 is formed on the other surface. The thickness of each of the air electrode 29 and the fuel electrode 30 is fundamentally made uniform, although some variations inevitably occur due to production tolerances.

Conductive strips 21 are formed on the surface of the air electrode 29 in the form of a checkerboard pattern. In the illustrated embodiment, the conductive strips 21 are formed in a lattice fashion having four rows and four columns. The air electrode 29 is exposed at a total of nine locations each having a square shape.

The air electrode 29 may be made of a conductive perovskite-type oxide such as $LaMnO_3$, $CaMnO_3$, $LaNiO_3$, $LaCoO_3$ or $LaCrO_3$ doped or not. $LaMnO_3$ doped with strontium is preferable. The ion-conductive ceramic plate 53 is preferably made of zirconia, and more preferably made of zirconia completely or partially stabilized with yttria, calcia, magnesia or ceria. The fuel electrode 30 is preferably made of nickel-zirconia cermet, cobalt-zirconia cermet, or chromium-zirconia cermet.

Further, as shown by a parenthesized number in FIG. 1, conductive strips 22 are formed on the surface of the fuel electrode 30 in the form of a checkerboard pattern. In the illustrated embodiment, the conductive strips 22 are formed in a lattice fashion having four rows and four columns. The fuel electrode 30 is exposed at a total of nine locations each having a square shape.

The conductive strips 21 and 22 must be stable and corrosion-resistive at not less than an operation temperature of the SOFC. As a conductive material satisfying these requirements, metals such as Ag, Au, Pb and Pt, alloys such as Ag-Au, Ag-Pd Ag-Pd and Pd-Pt, nickel-zirconia cermet, chromium-zirconia cermet, and cobalt-zirconia cermet may be used.

Furthermore, when the conductive strips are to be formed on the surface of the air electrode 29, a material for the conductive strips may be selected among the above-recited materials for the air electrode. On the other hand, when the conductive strips are to be formed on the surface of the fuel electrode 30, a material for the conductive strips may be selected among the above-recited materials for the fuel electrode.

According to this embodiment, since the conductive strips 21 and 22 are formed on the surface of each of the electrodes in the lattice fashion, electrons flow through these conductive strips 21, 22 and in parallel to the electrode. Therefore, since the conductive strips 21 and 22 function as a kind of the current collector, current generated in each of the electrodes can flow in parallel to the electrode under low resistance as a whole. Thereby, the voltage loss can be reduced when the current flows in parallel to the electrode.

On the other hand, even when the air electrode 29 and the fuel electrode 30 themselves are made thin, the gas-diffusing resistance thereof can be reduced. Even when the electrodes are made thin like this, increase in the voltage loss can be suppressed by the action of the conductive strips 21 and 22. Therefore, the output of the flat plate-shaped SOFC element 43 can be increased.

Next, the process for producing such a flat plate-shaped SOFC element 43 will be explained.

First, a flat plate-shaped green sheet is prepared from an ion-conductive ceramic molding material, and an ion-conductive ceramic plate 53 is formed by sintering this flat plate-shaped green sheet. An air electrode 29 is formed on one surface of the ion-conductive ceramic plate, and a fuel electrode 30 is formed on the other surface of the ceramic plate. In order to form the air electrode and the fuel electrode, a film of an air electrode-forming material and a film of a fuel electrode-forming material are formed on the opposite surface of the ion-conductive ceramic plate 53, respectively, and the resulting composite structure is heated. Conductive strips 21 and/or 22 are formed on the surface of the thus formed air electrode 29 and/or fuel electrode 30 by printing or vapor deposition.

Alternatively, it may be that an air electrode 29 is formed on one surface of a flat plate-shaped green sheet, and a fuel electrode 30 is formed on the other surface of the green sheet. In this case, a film of an air electrode-forming material and a film of a fuel electrode-forming material are formed on opposite surfaces of the green sheet, respectively, by printing, immersion or slurry coating, and then the thus film-formed green sheet is integrally sintered.

In the above embodiment, the conductive strips 21, 22 are formed in a checkerboard pattern having four rows and four columns. The numbers of the rows and the columns may be arbitrarily changed. Each section defined by the conductive strips 21 and 22 may be rectangular, rhombic, triangular, hexagonal or the like. Further, it may be that the conductive strips 21, 22 do not form a lattice, but are, for example radially formed. However, since current needs to flow through the conductive strips, the conductive strips 21, 22 must be formed in a continuous pattern on the surface of the air electrode 29 or the fuel electrode 30.

Next, one example of an SOFC (collected cell) suitably utilizing the flat plate-shaped SOFC elements constructed above will be explained hereinafter.

Figure 3:
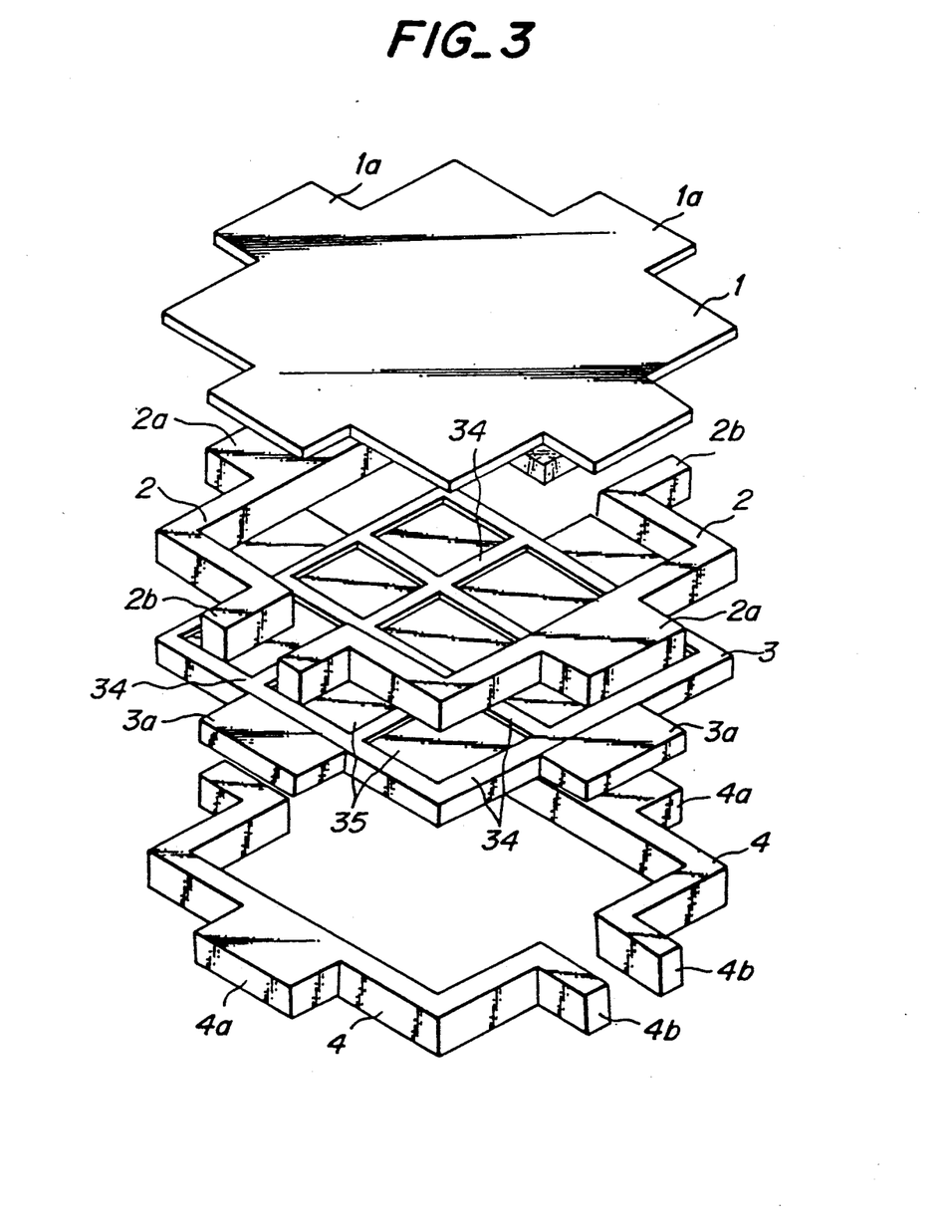
FIG. 3 is an exploded perspective view illustrating one embodiment of the SOFC according to the invention.
Figure 4:
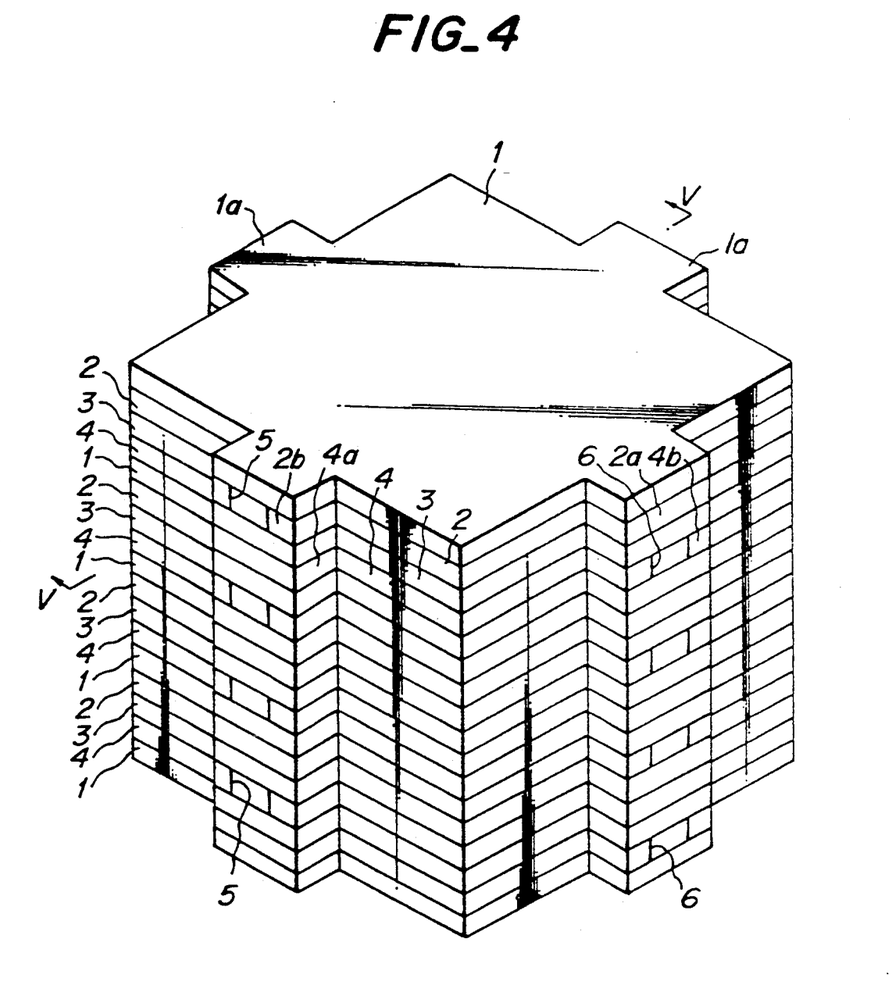
FIG. 4 is a perspective view illustrating the SOFC composed of the components shown in FIG. 3.
Figure 5:
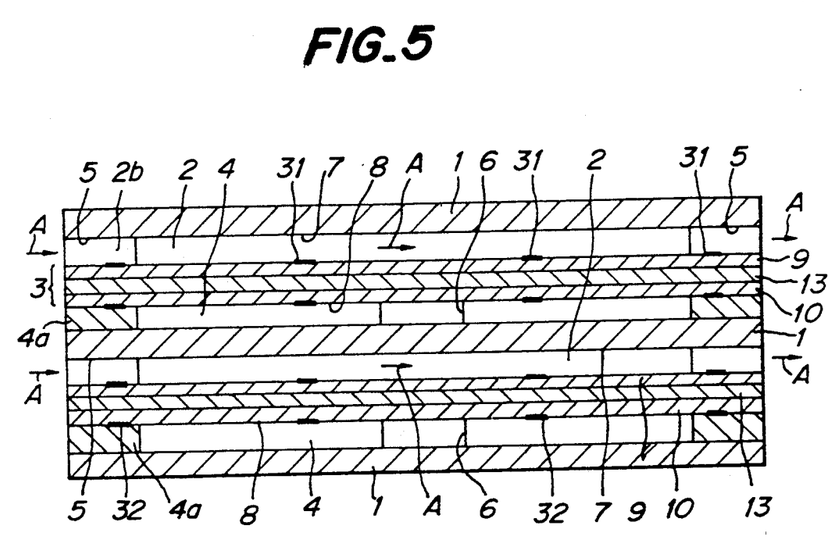
FIG. 5 is a sectional view of the SOFC taken along a line V—V in FIG. 4.

FIG. 4 is a perspective view illustrating such an SOFC according to an embodiment of the invention, and FIG. 3 is an exploded perspective view of a part of the SOFC. FIG. 5 is a sectional view of the SOFC taken along the line V—V in FIG. 4.

Referring to FIG. 3, components of the SOFC will be explained. A separator plate 1 is in the form of a square flat plate whose four sides are provided with rectangular projections 1a, respectively. The separator plate 1 is made of a material which has oxidation resistance, reduction resistance and electron conductivity.

A pair of air electrode spacers 2 are placed on an under side of the separator plate 1. The main part of each of the spacers 2 has a substantially U-shaped plane form, which is provided with a pair of projections 2b aligned with each other and a rectangular plane projection 2a. As shown in FIG. 3, the aligned projections 2b of a pair of the air electrode spacers 2 are opposed to each other, while the projections 2a are directed toward opposite directions. The spacers 2 are made of a material having oxidation resistance and electron conductivity.

A SOFC element 3 is in the form of a square flat plate whose four sides are provided with rectangular projections 3a. As shown in FIG. 5, the SOFC element 3 includes an ion-conductive ceramic plate 13, which has an air electrode 9 and a fuel electrode 10 formed on upper and lower surfaces thereof, respectively. As particularly shown in FIGS. 3 and 5, the conductive strips 31 are formed on the surface of the air electrode 9 in the form of a lattice in the sam manner as in FIG. 1. Further, as shown in FIG. 5, the conductive strips 32 are formed on the surface of the fuel electrode 10 in the form of a lattice in the same manner as in the case of the conductive strips 22 shown in FIG. 1.

In FIGS. 3 and 4, illustration of the laminated structure of the flat plate-shaped SOFC element is omitted for avoiding duplication.

The material and the forming method of the conductive strips 31 and 32 are the same as those in the case of the conductive strips 21 and 22.

A pair of fuel electrode spacers 4 are placed on an under surface of the SOFC element 3. The main part of each of spacer 4 has a substantially U-shaped plane form, which is provided with a pair of projections 4b aligned with each other and a rectangular plane projection 4a. As shown in FIG. 3, the aligned projections 4b of a pair of the fuel electrode spacers 4 are opposed to each other, while the projections 4a are directed toward opposite directions. The spacers 4 are made of a material having reduction resistance and electron conductivity.

As shown in FIG. 4, these components are laminated in the order of the separator plate 1, the air electrode spacers 2, the SOFC element 3, the fuel electrode spacers 4 and a further separator plate 1. Only a part of the laminated construction is shown in FIGS. 3 and 5 for the sake of clarity. In laminating these members, they are positioned so that the outer contours of the respective projections 1a, 2a, 2b, 3a, 4a and 4b are substantially vertically aligned.

As shown in FIGS. 4 and 5, an oxidizing gas chamber 7 is defined by the separator plate 1, a pair of the spacers 2 and the flat plate-shaped SOFC element 3. The air electrode 9 is of course opposed to the oxidizing gas chamber 7. An oxidizing gas opening 5 is defined by the separator plate 1, a pair of the opposed projections 2b and the flat plate-shaped SOFC element 3. A pair of oxidizing gas openings 5 are provided on both sides in this embodiment.

A fuel gas chamber 8 is defined by the separator plate 1, a pair of spacers 4 and the flat plate-shaped SOFC element 3. The fuel electrode 10 is of course opposed to the fuel gas chamber 8. A fuel gas opening 6 is defined by the separator plate 1, a pair of the opposed projections 4b and the flat plate-shaped SOFC element 3. A pair of fuel gas openings 6 are provided on both sides in this embodiment.

Ultimately, the oxidizing gas chambers 7 and the fuel gas chambers 8 are alternately provided, and are separated by the SOFC elements or the separator plates 1.

In operating the SOFC, an oxidizing gas is supplied through one of the two oxidizing gas openings 5 as shown in an arrow A in FIG. 5. The oxidizing gas flows through the oxidizing gas chamber 7 in the arrow A direction, and is exhausted from the other oxidizing gas opening 5. On the other hand, when a fuel gas is supplied through one of the fuel gas openings 6, the fuel gas flows through the fuel gas chamber 8 and is exhausted from the other fuel gas opening 6. In this embodiment, the oxidizing gas flows perpendicularly to the flow of the fuel gas. However, the flows of these gases may be parallel to each other in the same direction or in opposite directions.

The oxidizing gas produces oxygen ions at the interface between the air electrode 9 and the ion-conductive ceramic plate 13. These oxygen ions move through the ion-conductive ceramic plate 13 to the fuel electrode 10 where the oxygen ions react with the fuel and release electrons to the fuel electrode 10.

As mentioned above, oxygen ions are moved through various portions of the air electrode 9 and the fuel electrode 10, so that potential between these electrodes is taken out as current. That is, current flows through the filmy air electrode 9 and the filmy fuel electrode 10 in lateral directions. At the same time, the surrounding current is collected by the lattice-shaped conductive strips 31 and 32, and then the collected current flows through the conductive strips 31 and 32. The current is collected by the conductive spacers 2, 4.

The fuel electrode 10 of the flat plane shaped SOFC element 3 and the air electrode 9 of the vertically adjacent SOFC element 3 are electrically connected to each other through the fuel electrode spacer 4, the separator plate 1, and the air electrode spacer 2 which all have electron conductivity. Therefore, plural SOFC elements 3 are electrically connected in series in vertical directions in FIGS. 4 and 5. As shown in FIG. 4, each stack is provided with the separator plates 1 on its upper and lower ends. Therefore, electric power can be obtained by connecting a load between a pair of the separator plates 1.

The separator plates 1 should have electron conductivity and resistance to the fuel and oxidizing gases to be used in operating the SOFC. The following materials fulfilling these requirements may be used.

(1) Alloys such as Ni-Cr, Ni-Fe-Cr, Ni-Fe-Cr-Al, Co-Ni-Cr, Fe-Cr, and Fe-Cr-Al, high melting point noble metals such as Pt, Au, and Pd and Ni alloy.

(2) $LaCrO_3$ ceramics and $LaMnO_3$ ceramics.

The air electrode spacers 2 should have electron conductivity and oxidizing gas resistance. Following materials are preferable for the air electrode spacer 2.

(1) Ceramics of $LaMnO_3$, $LaCoO_3$, $La_{1-x}Sr_xMnO_3$ and $LaNiO_3$.

(2) High melting point noble metals such as Pt, Au and Pd.

The fuel electrode spacer 4 should have electron conductivity and fuel gas resistance. Following materials are preferable for the fuel electrode spacer 4.

(1) Metals such as Ni and Co
(2) Nickel-zirconia cermet

A gas containing a fuel gas such as hydrogen, reformed hydrogen, carbon monoxide, or hydrocarbon is used as the fuel gas. As the oxidizing gas, a gas containing an oxidizing agent such as oxygen or hydrogen peroxide and the like is used.

In the embodiment shown in FIG. 4, the reduction-resistant and oxidation-resistant separator plates 1 are provided on the upper and lower ends of the SOFC (stack). However, since the separator plate 1 on the top of the stack faces only to the oxidizing gas chamber 7, the separator plate 1 is not necessarily required to be reduction-resistant. On the other hand, since the separator plate 1 at the bottom of the stack faces only to the fuel gas chamber 8, this separator plate 1 does not necessarily need to be oxidation-resistant.

With the SOFC as described above, since the main components such as spacers 2 and 4, the separator plate 1 and the ion-conductive ceramic plate 13 have flat plate-shapes, they can be produced by a conventional shaping method such as tape-casting or press-forming. Therefore, these components can be easily produced at low costs, without requiring apparatuses on a large scale as in chemical vapor deposition (CVD) or electro-chemical vapor deposition (EVD). Particularly, since the ion-conductive ceramic plate 13 needs no CDV, EVD or the like for its production, the productivity is high and it is possible to produce ion-conductive ceramic plates 13 having wider areas.

Moreover, a plurality of SOFC elements 3 are easily connected in series only by laminating the above components.

Furthermore, since electric current is caused to be collected through the spacers 2 and 4 and the separators 1 themselves without requiring any particular current collector for connecting the SOFC elements 3, the electric current flows through over the entire contact surfaces of the components, so that resistances at the connection portions are low resulting in less voltage drop. Moreover, it is possible to enlarge the contact surface between the air electrode 9 and the spacer 2 and that between the fuel electrode 10 and the spacer 4. Further, as these contact surfaces linearly extend long along the shapes of the spacers 2 and 4, distances, through which the electric current flows in parallel along and within the films of the air electrode 9 and the fuel electrode 10.

In addition, since the conductive strips 31 and 32 are provided in lattice form, current can flow through these conductive strips 31, 32. Consequently, the voltage loss inside the flat plate-shaped SOFC element 3 is greatly reduced.

Moreover, a porous support member is not used for the flat plate-shaped SOFC element 3, so that the electric resistance is lower by that of such a support member. Further, the materials of the separator plate 1, the air electrode spacer 2 and the fuel electrode spacer 4 can be most suitably selected in consideration of the electron conductivity and the resistance to the atmospheres, so that the internal resistance of the entire stack can be restrained to a low value. If the separator plate 1, the air electrode spacer 2 and the fuel electrode spacer 4 were integrally formed, the whole unit must be formed by a material which has reduction resistance, oxidation resistance and electron conductivity. Consequently, the range of material to be selected will be very narrow and it will become difficult to restrain the internal resistance of the entire stack to a low value.

Furthermore, the internal resistance and structural strength of the stack can be optimized by properly changing the thicknesses of the separator plate 1 and the spacers 2 and 4.

Moreover, it is preferable that after a separator plate 1, an air electrode spacer 2 and fuel electrode spacer 4 are separately produced by sintering, the air electrode spacer 2 and the fuel electrode spacer 4 are bonded to opposite surfaces of the separator plate 1 by means of an electron conductive adhesive. In this manner, it becomes possible to sinter the separator plate 1 and the spacers 2 and 4 under the optimum conditions commensurate with the respective materials of these components.

Since the components of the stack shown in FIG. 4 are all in the form of flat plates, they can be easily formed by tape-casting, press-forming, doctor blade methods. In order to obtain green sheets of a predetermined configuration, it is necessary to punch a raw green sheet.

The flowing materials are preferable as the electron conductive adhesive.

Figure 6:
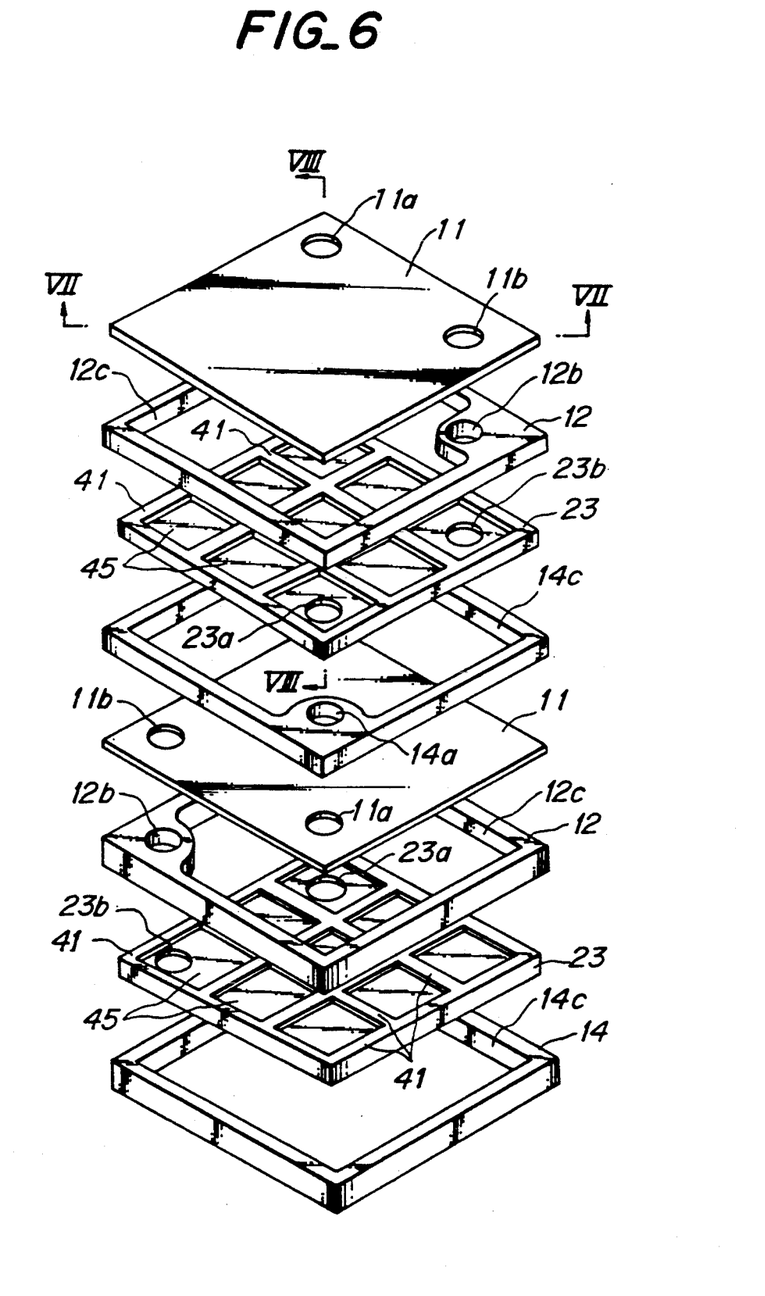
FIG. 6 is an exploded perspective view illustrating another embodiment of the SOFC according to the invention.
Figure 7:
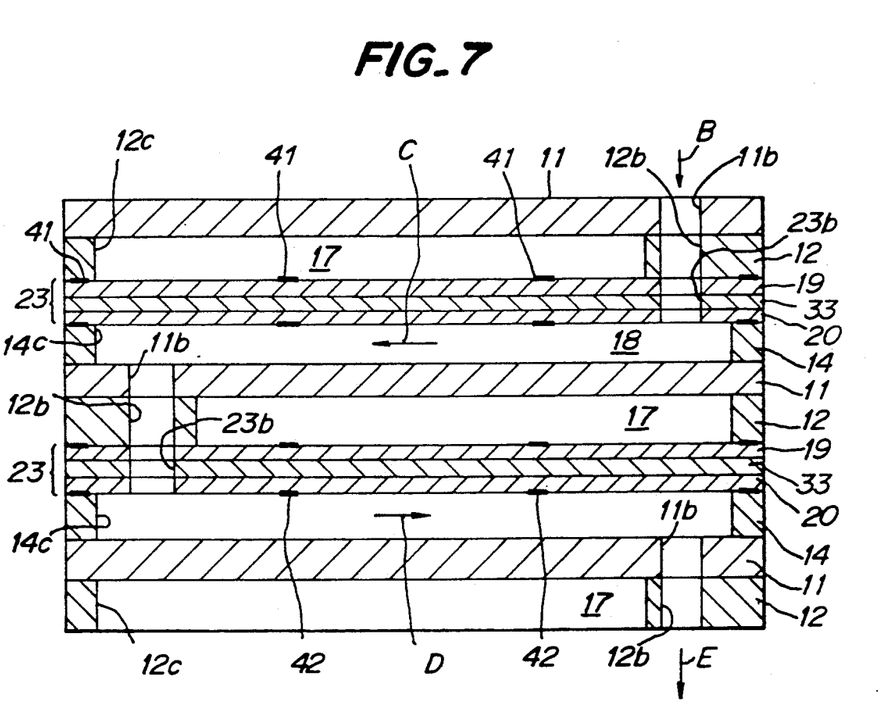
FIG. 7 is a sectional view of the SOFC taken along a line VII—VII in FIG. 6.
Figure 8:
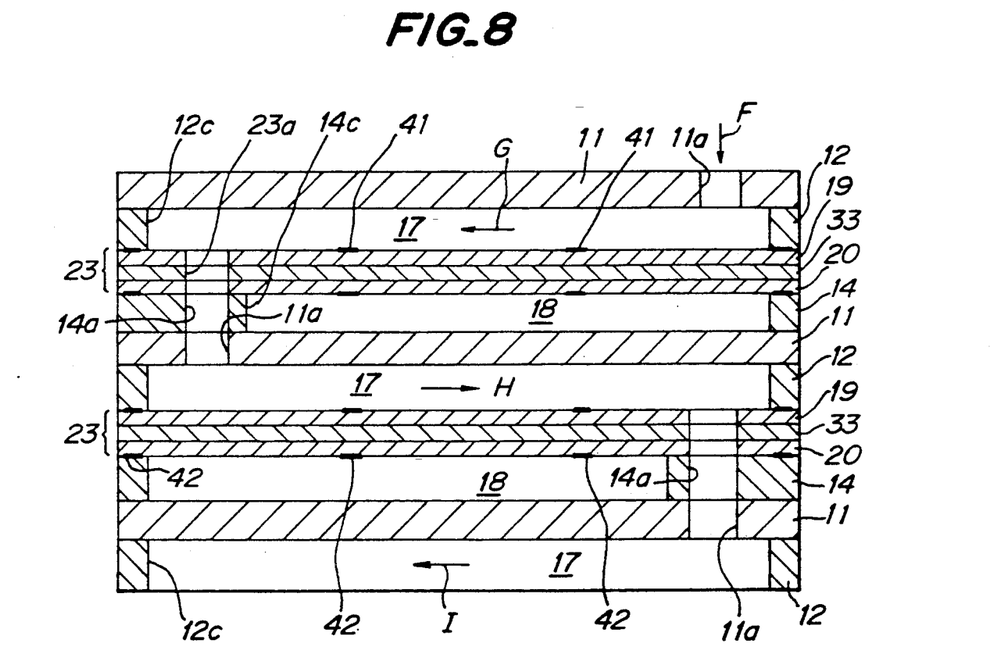
FIG. 8 is a sectional view of the SOFC taken along a line VIII—VIII in FIG. 6.

(1) Paste of Pt, Pd, Ag-Pd, Au or Ni metal powder
(2) Paste of $LaMnO_3$, $LaCrO_3$ or $LaCoO_3$ FIG. 6 illustrates a part of the SOFC of another embodiment according to the invention in an exploded perspective view. FIGS. 7 and 8 are sectional views of the SOFC taken along lines VII—VII and VIII—VIII in FIG. 6, respectively.

First, a square separator plate 11 is arranged in the uppermost portion. The separator plate 11 is made of a material which has oxidation resistance, reduction resistance, and electron conductivity. The plate 11 may be actually formed by the same material and in the same manner as explained with respect to the above separator plate 1. The separator plate 11 is formed with a circular oxidizing gas opening 11a and a circular fuel gas opening 11b.

An air electrode spacer 12 is laminated on the underside of the separator plate 11. The spacer 12 is formed with a substantially square punched portion 12c convexed at its one corner where a fuel gas opening 12b is formed. The air electrode spacer 12 is made of a material having oxidation resistance and electron conductivity. The space 12 may be actually formed by the same material and in the same manner as explained with respect to the air electrode spacer 2.

A flat plate-shaped SOFC element 23 is laminated on the underside of the air electrode spacer 12. The element 23 is formed with a circular oxidizing gas opening 23a and a circular fuel gas opening 23b. In more detail, the flat plate-shaped ion-conductive ceramic plate 33 of the SOFC element 23 is formed with an air electrode 19 and a fuel electrode 20 on upper and lower surfaces, respectively.

In FIG. 6, illustration of the laminated structure of the SOFC element itself is omitted.

Further, as shown in FIGS. 6 to 8, conductive strips 41 are formed on the surface of an air electrode 19 in a lattice shape in the same manner as in FIG. 1. Further, as shown in FIGS. 7 and 8, conductive strips 42 are formed on the surface of a fuel electrode 20 in the same manner as the conductive strips 22 shown in FIG. 1. The material and the forming method of the SOFC element are the same as those of the SOFC element 43 shown in FIG. 1.

A fuel electrode spacer 14 is laminated on the underside of the flat plate-shaped SOFC element 23. The spacer 14 is formed with a substantially square punched portion 14c convexed at its one corner where an oxidizing gas opening 14b is formed. The fuel electrode spacer 14 is made of a material which has reduction resistance and electron conductivity. The spacer 14 may be actually formed by the same material and in the same manner as explained in connection with the fuel electrode spacer 4.

On the underside of the fuel electrode spacer 14 are laminated a separator plate 11, an air electrode spacer 12, a flat plate-shaped SOFC element 23 and a fuel electrode spacer 11. Further components are laminated in the same manner. A separator plate 11 is located at the lowermost end of the stack. Electric power can be taken out by connecting a load between the separator plates 11 at the upper and lower ends.

In the laminated SOFC (stack), an oxidizing gas chamber 17 is defined by the separator plate 11, the air electrode spacer 12 and the flat plate-shaped SOFC element 23 as shown in FIGS. 7 and 8. On the other hand, a fuel gas chamber 18 is defined by the separator plate 11, the fuel electrode spacer 14 and the flat plate-shaped SOFC element 23. In this case, the oxidizing gas chamber 17 corresponds to the punched portion 12c of the air electrode spacer 12 in disassembled state of the SOFC, while the fuel gas chamber 18 corresponds to the punched portion 14c of the fuel electrode spacer 14. Of course, the air electrode 19 faces the oxidizing gas chamber 17, while the fuel electrode 20 faces the fuel gas chamber 18.

Next, the flow of the fuel gas will be explained.

When the separator plates 11, the spacers 12 and 14 and the flat plate-shaped SOFC elements 23 are laminated, the fuel gas openings 11b, 12b and 23b are vertically aligned and communicated with each other as shown in FIG. 7. The fuel gas opening 12b is separated from the oxidizing gas chamber 17. In FIG. 7, the fuel gas openings 11b, 12b and 23b are located on the right side in the first stack, on the left side in the second stack, and on the right side in the third stack. They are located in the same manner in the following stacks.

In operating the SOFC, a fuel gas is supplied thereinto as shown by an arrow B. The fuel gas flows through the fuel gas openings 11b, 12b and 23b into the fuel gas chamber 18 in which the fuel gas flows as shown by an arrow C. After arriving at the left end of the fuel gas chamber 18, the fuel gas again flows through the fuel gas openings 11b, 12b and 23b at the left side of the stack into the fuel gas chamber 18 in which the fuel gas flows as shown by an arrow D. Thereafter, the fuel gas arrives at the right hand end of the fuel gas chamber 18 and flows through the fuel gas openings 11b and 12b as shown by an arrow E. The fuel gas continues to flow from the upper end to the lower end of the SOFC.

Next, the flow of the oxidizing gas will be explained.

When the separator plates 11, the spacers 12 and 14, and the flat plate-shaped SOFC elements 23 are laminated, the oxidizing gas openings 11a, 14a and 23a are vertically aligned and communicated with each other as shown in FIG. 8. The oxidizing gas opening 14a is separated from the fuel gas chamber 18. In FIG. 8, the oxidizing gas opening 11a is located on the right side in the uppermost separator plate 11. The vertically aligned oxidizing gas openings 23a, 14a and 11a are located on the left side in the first stack, on the right side in the second stack, and on the left side in the third stack. They are located in the same manner in the following stacks.

In operating the SOFC, an oxidizing gas is supplied thereinto as shown by an arrow F. The oxidizing gas flows through the fuel gas opening 11b into the oxidizing gas chamber 17 in which the oxidizing gas flows as shown by an arrow G. After arriving at the left end of the oxidizing gas chamber 17, the oxidizing gas flows through the oxidizing gas openings 23a, 14a and 11a into the oxidizing gas chamber 17 in which the oxidizing gas flows as shown by an arrow H. Thereafter, the oxidizing gas arrives at the right hand nd of the oxidizing gas chamber 17 and flows through the oxidizing gas openings 23a, 14a and 11a in the oxidizing gas chamber 17 as shown by an arrow I. The oxidizing gas continues to flow from the upper end to the lower end of the SOFC in this manner.

Moreover, since the separator plates 11, the air electrode spacers 12, the flat plate-shaped SOFC elements 23 and the fuel electrode spacers 14 are successively laminated to form the stacks, the effects explained with the SOFC shown in FIGS. 3 to 5 can be also accomplished in this case. Further, these components can be laminated in the similar manner to that of the SOFC shown in FIGS. 3 to 5.

In addition, the fuel gas is caused to flow from the upper end to the lower end of the SOFC without requiring separate supply of the fuel gas to every fuel gas chamber 18. Therefore, the fuel gas supply mechanism can be largely simplified, and sealing can be easily effected to prevent leakage of the fuel gas. The same effects can be also achieved with respect to the flowing of the oxidizing gas. Moreover, the fuel gas and the oxidizing gas ar caused to flow diagonally across the substantially square fuel gas chamber 18 and the oxidizing gas chamber 17 in the arrow directions C and D, and G, H and I, respectively. Accordingly, it is easy to supply the fuel gas and oxidizing gas uniformly all over the surfaces of the fuel and air electrodes 20 and 19.

It is more preferable that the fuel gas does not directly contact the walls of the fuel gas openings 11b, 12b and 23b in the embodiment shown in FIGS. 6 to 8. For this purpose, a fuel gas conduit is formed from a material which is at least reduction-resistant, and this fuel gas conduit is fitted in the fuel gas openings 11b, 12b and 23b so that the fuel gas flows in the internal space of the fuel gas conduit without directly contacting the fuel gas openings.

It is also more preferable that the oxidizing gas does not directly contact the walls of the oxidizing gas openings 23a, 14a and 11a. For this purpose, an oxidizing gas conduit is formed from a material which is at least oxidation-resistant, and this oxidizing gas conduit is fitted in the oxidizing gas openings 23a, 14a and 11a so that the oxidizing gas flows in the internal space of the oxidizing gas conduit without directly contacting the oxidizing gas openings.

In the above embodiments, each of the SOFC stacks may be turned upside down. Moreover, the SOFC stacks may be supported in the horizontal direction.

While each of the spacers 2 and 4 is divided into two parts in the embodiment shown in FIGS. 3 to 5, they may be divided into three or more parts.

In the above embodiments, the planar configurations of the components of the SOFC may be changed in various ways. Moreover, the oxidizing gas openings 5, 23a, 14a and 11a and the fuel gas openings 6, 11b, 12b and 23b may have cross-sections other than the circular cross-sections. Moreover, the numbers of these openings may be increased.

In the embodiment of FIG. 6, the second separator plate 11 is rotated by 180° from the position of the first separator plate 11. However, the second separator plate 11 may be positioned rotated by 90° relative to the uppermost separator plate 11. Other components must of course be positionally adjusted to the separator plates 11 at the same time.

According to the present invention, since the conductive strips are provided in a continuous pattern on the surface of at least one of the air electrode and the fuel electrode, electrons flow in parallel to the electrode through the conductive strips. Therefore, the conductive strips function as a kind of current collector, so that the voltage loss when the current flows in parallel to the electrode can be reduced.

In addition, since the electrode itself having the conductive strips formed on the surface can be made thin, the gas-diffusing resistance can be made smaller. By so doing, increase in the voltage loss can be suppressed by the action of the above conductive strips. Accordingly, outputs of the flat plate-shaped SOFC element can be increased.

What is claimed is:

1. A solid oxide fuel cell comprising a separator plate made of a material having oxidation resistance, reduction resistance and electron conductivity, an air electrode spacer made of a material having oxidation resistance and electron conductivity, a flat plate-shaped solid oxide fuel cell element, a fuel electrode spacer made of a material having reduction resistance and electron conductivity and another spacer plate made of a material having oxidation resistance, reduction resistance and electron conductivity, said separator plate, said air electrode spacer, said flat plate-shaped solid oxide fuel cell element, said fuel electrode spacer and said another spacer plate being successively laminated in this order, said solid oxide fuel cell element comprising an ion-conductive ceramic plate, and an air electrode and a fuel electrode formed on opposite surfaces of said ion-conductive ceramic plate, respectively, wherein conductive strips which have less resistance than said electrode are formed in a continuous pattern on a surface of at least one of said air electrode and said fuel electrode, wherein an oxidizing gas chamber is defined by said separator plate, said air electrode spacer and said fuel cell element, and a fuel gas chamber is defined by said another separator plate, said fuel electrode spacer and said fuel cell element.

2. The solid oxide fuel cell as set forth in claim 1, wherein said separator plates are square flat plates whose four sides are formed with rectangular projections, respectively, each of said air electrode spacer and said fuel electrode spacer has a substantially U-shaped form including a pair of aligned projections outwardly extending from ends of legs of the U-shaped form and a rectangular projection outwardly extending from a bottom of the U-shaped form, and said flat plate-shaped solid oxide fuel cell element is a square flat plate whose four sides are formed with rectangular projections to conform with the projections of the separator plates and the spacers.

3. The solid oxide fuel cell as set forth in claim 1, wherein said separator plates are substantially square flat plates each formed with an oxidizing gas opening and a fuel gas opening, respectively, said air electrode spacer is a substantially square flat late formed with a substantially square punched portion convexed at its corner where a fuel gas opening is formed, said flat plate-shaped solid oxide fuel cell element is a square flat plate formed with an oxidizing gas opening and a fuel gas opening, and said fuel electrode spacer is substantially a square flat plate formed with a substantially square punched portion convexed at its corner where an oxidizing gas opening is formed, said oxidizing gas opening and said fuel gas opening of the fuel element being in conformity with said oxidizing gas opening of the air electrode spacer and said fuel gas opening of the fuel electrode spacer, respectively.

* * * * *

UNITED STATES PATENT AND TRADEMARK OFFICE
CERTIFICATE OF CORRECTION

PATENT NO. : 5,326,650
DATED : July 5, 1994
INVENTOR(S) : Yoshihiko Ishida

It is certified that error appears in the above-indentified patent and that said Letters Patent is hereby corrected as shown below:

```
Title page, item [54], col. 1. line 2, after "PRODUCING" insert --
THE SAME--.
```

Signed and Sealed this

Thirtieth Day of August, 1994

Attest:

BRUCE LEHMAN

Attesting Officer

Commissioner of Patents and Trademarks